(12) United States Patent
Hackert et al.

(10) Patent No.: US 10,791,678 B2
(45) Date of Patent: Oct. 6, 2020

(54) MOVABLE FEED FLOOR FOR A COTTON HARVESTER

(71) Applicant: DEERE & COMPANY, Moline, IL (US)

(72) Inventors: Ryan A. Hackert, Ankeny, IA (US); Kevin J. Goering, Cambridge, IA (US); Scott D. Weber, Bondurant, IA (US)

(73) Assignee: DEERE & COMPANY, Moline, IL (US)

( * ) Notice: Subject to any disclaimer, the term of this patent is extended or adjusted under 35 U.S.C. 154(b) by 238 days.

(21) Appl. No.: 15/898,792

(22) Filed: Feb. 19, 2018

(65) Prior Publication Data

US 2019/0254235 A1 Aug. 22, 2019

(51) Int. Cl.
*A01F 15/00* (2006.01)
*A01F 15/07* (2006.01)

(52) U.S. Cl.
CPC .. *A01F 15/0715* (2013.01); *A01F 2015/0755* (2013.01)

(58) Field of Classification Search
CPC .......... A01F 15/0715; A01F 2015/0755; A01F 15/141
USPC .................................................. 53/397, 587
See application file for complete search history.

(56) References Cited

U.S. PATENT DOCUMENTS

| 5,419,253 | A | * | 5/1995 | Campbell | ............. | A01F 15/141 100/3 |
| 2014/0237981 | A1 | | 8/2014 | Roberge | | |
| 2016/0353664 | A1 | * | 12/2016 | Weber | .................... | A01F 15/08 |
| 2017/0208745 | A1 | | 7/2017 | Reints et al. | | |

* cited by examiner

*Primary Examiner* — Chelsea E Stinson
(74) *Attorney, Agent, or Firm* — Taft Stettinius & Hollister LLP; Stephen F. Rost

(57) ABSTRACT

A method and apparatus for harvesting cotton including a cotton accumulator configured to accumulate cotton removed from cotton plants. A feeder system of a cotton harvester is configured to move independently of the cotton accumulator and along a longitudinal direction. A round module builder system is configured to move along the longitudinal direction toward the feeder system, wherein the round module builder includes a contact member adapted to contact the feeder system to establish a working gap between the feeder system and the round module builder. A wrap floor is moved toward and into contact with the feeder system, which is spring biased to maintain a substantially consistent gap between the between the feeder system and round module builder. Cotton is directed toward the round module builder and a directing mechanism directs a wrap for wrapping the directed cotton into a round module.

20 Claims, 9 Drawing Sheets

MOVABLE FEED FLOOR FOR A COTTON HARVESTER

FIELD OF THE DISCLOSURE

The present disclosure generally relates to a harvesting machine, and more particularly to a system and method for a cotton harvesting machine.

BACKGROUND

Agricultural equipment, such as a tractor or a self-propelled harvester, includes mechanical systems, electrical systems, hydraulic systems, and electro-hydraulic systems, configured to prepare fields for planting or to harvest crops.

When harvesting cotton, for instance, cotton from cotton plants is picked by a mobile cotton harvester, which includes a header that engages the cotton plant to remove the cotton from the field. The removed cotton is delivered to a relatively large basket which receives and holds the harvested cotton. The basket area is called an accumulator which accumulates a sufficient amount of cotton before being delivered to a baler or module builder. Many known cotton harvester baskets include apparatus for distributing and compacting the cotton to some extent, primarily to increase the amount of cotton which can be held in the accumulator.

Mobile cotton harvesters are often self-propelled cotton harvesting machines which typically come in two forms, namely a cotton stripper vehicle and a cotton picker vehicle. The cotton stripper is designed to remove the cotton bolls entirely, into the machine.

A cotton picker, on the other hand, "picks" the mature cotton from the bolls, typically by using revolving spindles. Cotton pickers leave the cotton plant and unopened bolls, intact, such that a given field can be harvested more than once during a growing season.

Once a sufficient amount of cotton has been collected in the accumulator, the cotton is delivered to a cotton feeder system which in turn delivers the cotton to a module builder system. The feed system includes a conveyor belt to move cotton from the accumulator to an input of module builder system. The module builder system, upon receipt of the picked cotton from the feeding system, compresses the cotton into modules. Once compressed and wrapped, the packaged cotton is removed from the module builder system and delivered to a handler. The handler carries the packaged cotton until the operator decides to discharge it.

In different types of self-propelled cotton harvesters, which include the module builder system, there is a gap or space, between the output of the feeding system and the input to the module builder system. The relationship between the feeding system conveyor belt and the module builder system is critical. When the gap is too small, the feed conveyor can impede the wrap, resulting in an unwrapped module. When the gap is too large, excessive cotton loss during the feeding cycle can occur. In different types of the cotton harvesters, this gap is manually adjustable by the operator or user to set the gap. Once set, however, the gap is fixed to a set distance. Adjustment of the size of the gap is difficult, since the size of the gap is not only difficult to measure, but is also difficult to adjust in the known systems.

What is needed therefore is system and method to determine and to adjust the size of the gap between the feeder system and the module builder system.

SUMMARY

A movable feeder system is disclosed to optimize a gap between the feeder system and the module builder system and to insure the module is properly wrapped.

In one embodiment of the disclosure, there is provided a method of building a round module with a cotton harvesting machine having a feeding system and a round module builder including a wrap floor. The method includes: advancing the wrap floor toward and into contact with the feeding system; moving the feeding system in response to the advancing wrap floor; directing cotton from the feeding system to the round module builder; and wrapping the directed cotton into a round module.

In another embodiment, there is provided a cotton harvester including a cotton accumulator configured to accumulate cotton removed from cotton plants. The cotton harvester includes a feeder system configured to move independently of the cotton accumulator and along a longitudinal direction. A wrap floor is configured to move along the longitudinal direction toward the feeder system, wherein the wrap floor includes a contact member adapted to contact the feeder system to establish a working gap between the feeder system and the wrap floor.

In still another embodiment, there is provided a work vehicle for harvesting cotton. The work vehicle includes a cotton accumulator configured to accumulate cotton removed from cotton plants to provide a round cotton module bound with a wrap. The work vehicle includes a rolling feeder structure configured to move independently of the cotton accumulator and to move along a longitudinal direction. A wrap floor is configured to move toward and away from the rolling feeder structure. The wrap floor includes a contact member adapted to contact the feeder structure to establish a working gap between the wrap floor and the rolling feeder structure.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
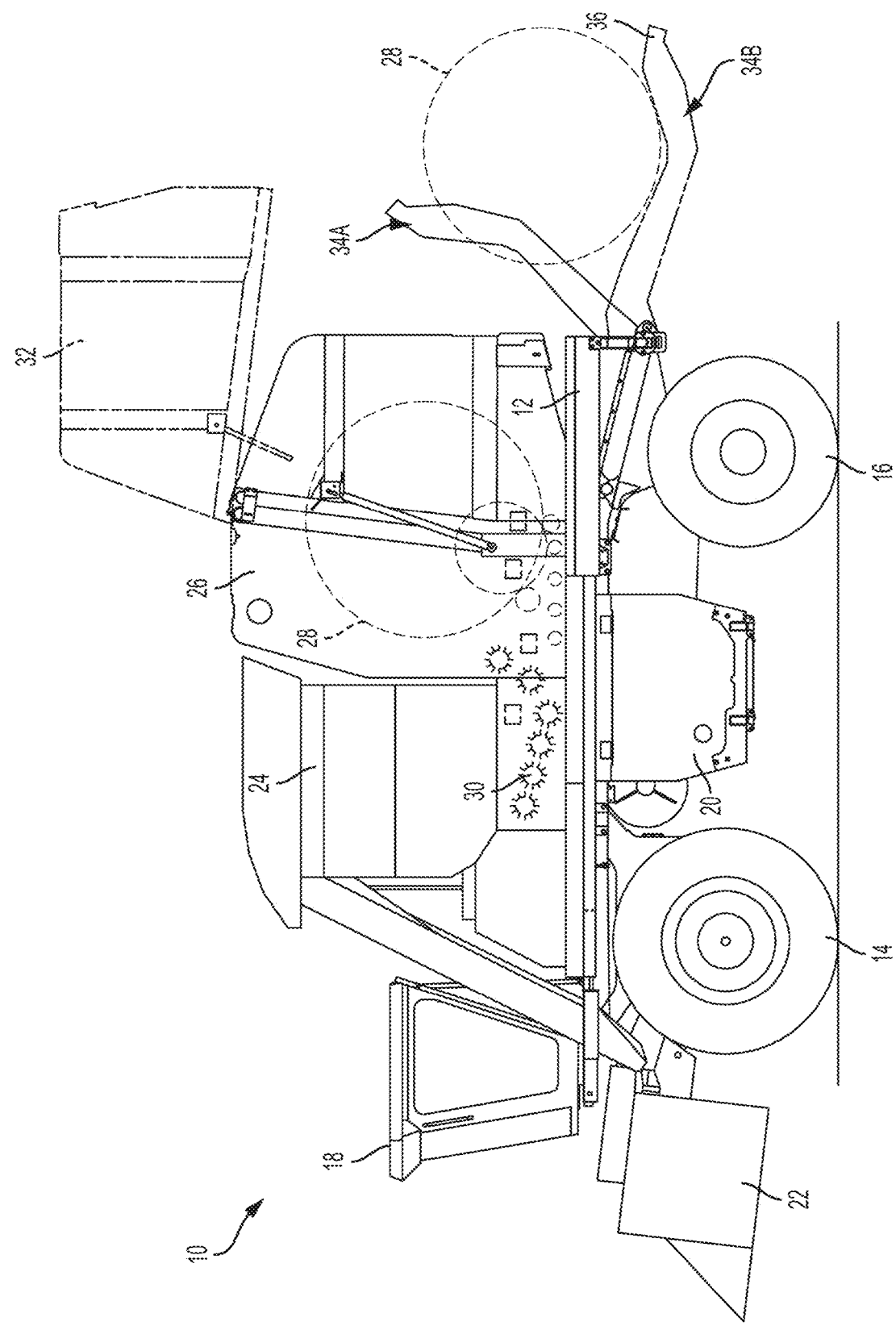
FIG. 1 is a side elevational view of a work vehicle, and more specifically, of an agricultural vehicle such as a cotton harvesting machine.

For the purposes of promoting an understanding of the principles of the novel disclosure, reference will now be made to the embodiments described herein and illustrated in the drawings and specific language will be used to describe the same. It will nevertheless be understood that no limitation of the scope of the novel disclosure is thereby intended, such alterations and further modifications in the illustrated devices and methods, and such further applications of the principles of the novel disclosure as illustrated therein being contemplated as would normally occur to one skilled in the art to which the novel disclosure relates.

FIG. 1 is a side elevational view of an agricultural vehicle, and more particularly a cotton picker baler 10, including a frame 12 supported on a pair of front wheels 14 and a set of rear wheels 16. An operator cab 18 is mounted on the frame 12 and contains various controls for the vehicle 10 so as to be within the reach of a seated or standing operator. In one aspect, these controls may include a steering wheel and a control console including a display as would be understood by one skilled in the art. An engine 20 is mounted on the frame 12 beneath a housing and supplies power for driven components of the tractor 10. The engine 20, for example, is configured to drive a transmission (not shown), which is coupled to drive the front wheels 14 at various selected speeds and either in forward or reverse modes. In other embodiments, the rear set of wheels is driven to move the harvester, or all of the wheels are driven in an all-wheel drive configuration to move the harvester 10.

While the described embodiments are discussed with reference to a harvester, in addition to agricultural vehicles, other work vehicles are contemplated including construction vehicles, forestry vehicles, lawn maintenance vehicles, as well as on-road vehicles such as those used to plow snow, spread salt, or vehicles with towing capability.

The cab 18 defines an operator workstation including a seat, which is supported by the frame 12. The operator workstation, in different embodiments, includes one or more of an operator user interface, steering wheel, a joystick, and an accelerator pedal. Pedals for a brake and a clutch are also located in the cabin 18, but are not shown.

The user interface includes a plurality of operator selectable buttons configured to enable the operator to control the operation and function of the tractor 10. The user interface, in one embodiment, includes a user interface screen or display having a plurality of user selectable buttons to select from a plurality of commands or menus, each of which are selectable through a touch screen having a display. In another embodiment, the user interface includes a plurality of mechanical push buttons as well as a touch screen. In another embodiment, the user interface includes a display screen and only mechanical push buttons.

The cotton picker baler 10 further includes a header 22, the position of which is adjustable with respect to the frame 12. The header 22 removes cotton from cotton growing in a field as the work machine 10 moves in a forward direction. A hopper 24 receives the picked cotton where it is stored in sufficient quantity to enable a round module builder 26 to bale the cotton in a round module 28. Cotton 30 leaves the hopper 24 and moves into a baler zone where it is compressed and baled into the round module 28. Once a module 28 is complete, a door 32 is opened where the module 28 exits from the baler and onto a bale handler 34. The bale handler 34 is positionable between a relatively upright position 34A and a relatively horizontal position 34B. An end 36 moves to a position toward the ground where the bale falls for later processing.

Figure 2:
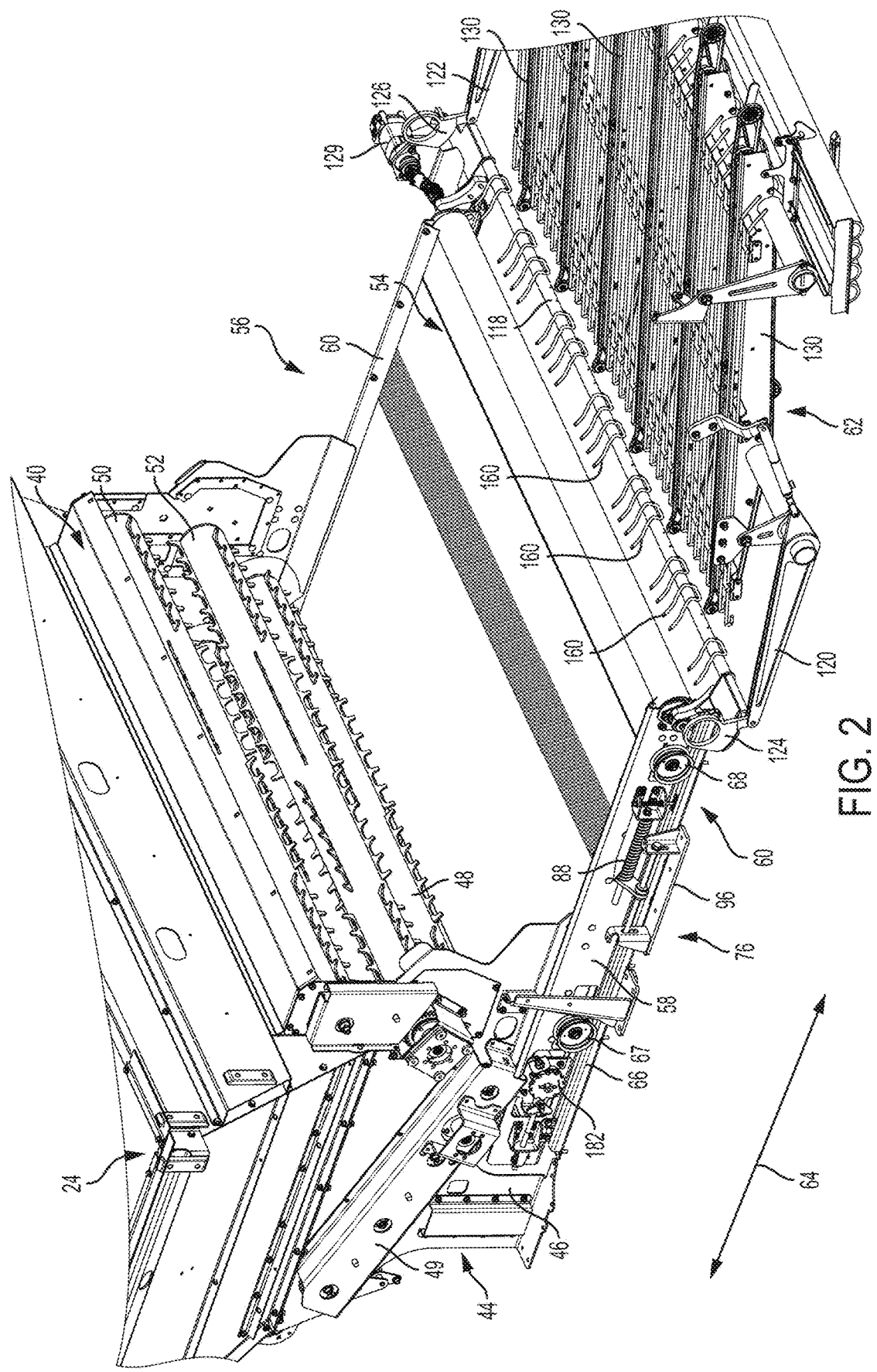
FIG. 2 is a partial perspective view of a cotton accumulator, a feeder system, and round module builder.
Figure 5:
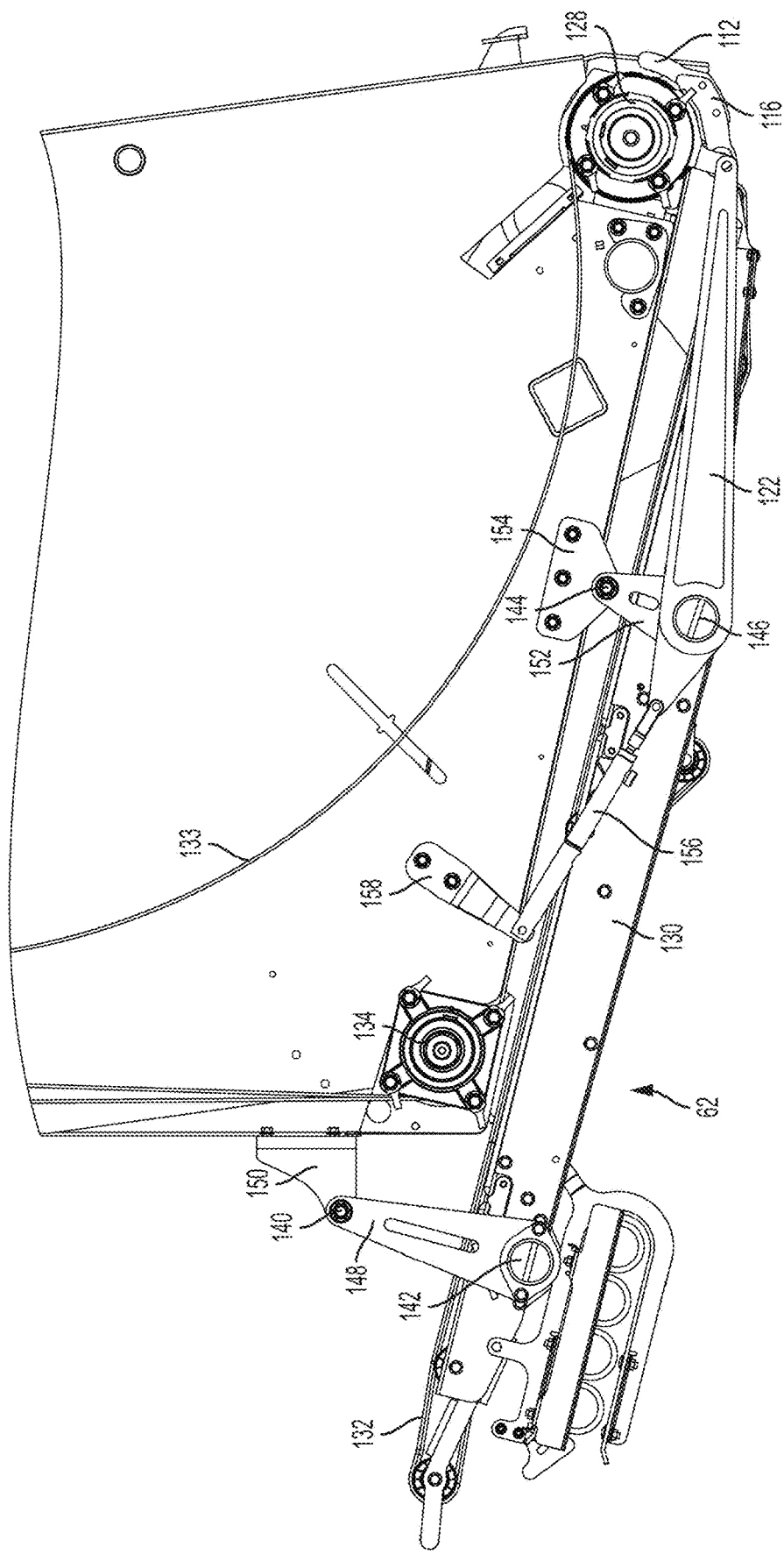
FIG. 5 is a side elevational view of a portion of the round module builder.

FIG. 2 is a partial perspective view of the hopper 24 which is disposed adjacently to a feeder and accumulator 40 which accumulates the cotton 30 from the hopper 24 and which feeds the accumulated cotton to a module builder 42 further described with respect to FIG. 5. In one embodiment, the module builder 42 is a round module builder. Other configurations of the module builder are contemplated. The feeder and accumulator 40 is located adjacent to and above a main chassis structure 44 which includes a frame 46 configured to support four meter rolls 48 which are supported for rotation by the meter roll support 49. The frame 46 also supports a first beater roll 50 and a second beater roll 52. The four meter rolls 48 and the beater rolls 50 and 52 prepare the accumulated cotton as would be understood by those skilled in the art to process the cotton 30 for making the module 28.

The prepared cotton is metered onto a feed conveyor belt 54, which is part of a feed conveyor system 56. The feed conveyor belt 54 collects and moves the processed cotton toward the module builder 42. The belt 54 is a continuous belt which moves about front and rear rollers (not shown) which are rotatably supported by a first side member 58 and a second side member 60, each of which extends from the frame 46 toward a wrap floor 62, which is part of the module builder 42. A feeder structure 63, which includes the first side member 58, the second side member 60, and the belt 54, is movable along a longitudinal direction 64 toward and away from the wrap floor 62 along a first track 66 and a second track (not shown) on an opposite side of the feed conveyor system 56. In one embodiment, the first and second tracks are fixedly coupled to the chassis of the work machine 10 and are also fixed with respect to the frame 46. The feeder structure 63 is configured to move with respect to the feeder and accumulator 40 during operation of the vehicle 10 without intervention by a user or operator. The feeder and accumulator 40 is stationary and fixed to the chassis of the vehicle, such that the feeder structure moves with respect to the feeder and accumulator 40 during production of a cotton module.

The feeder structure 63 includes a front wheel 67 and a rear wheel 68, both of which are rotatably coupled to the first side member 58. Each of the front wheel 67 and rear wheel 68 include a groove which engages the first track 66. The second side member 60 also includes a front wheel (not shown) having a groove wherein the wheel is transversely located from the front wheel 67. A rear wheel (not shown) having a groove is transversely located from the rear wheel 68. Each of the wheels 67, 68, and corresponding wheels at the second side member 60 provide four points of rolling support for the feed structure 63 on the first and second tracks.

Figure 3:
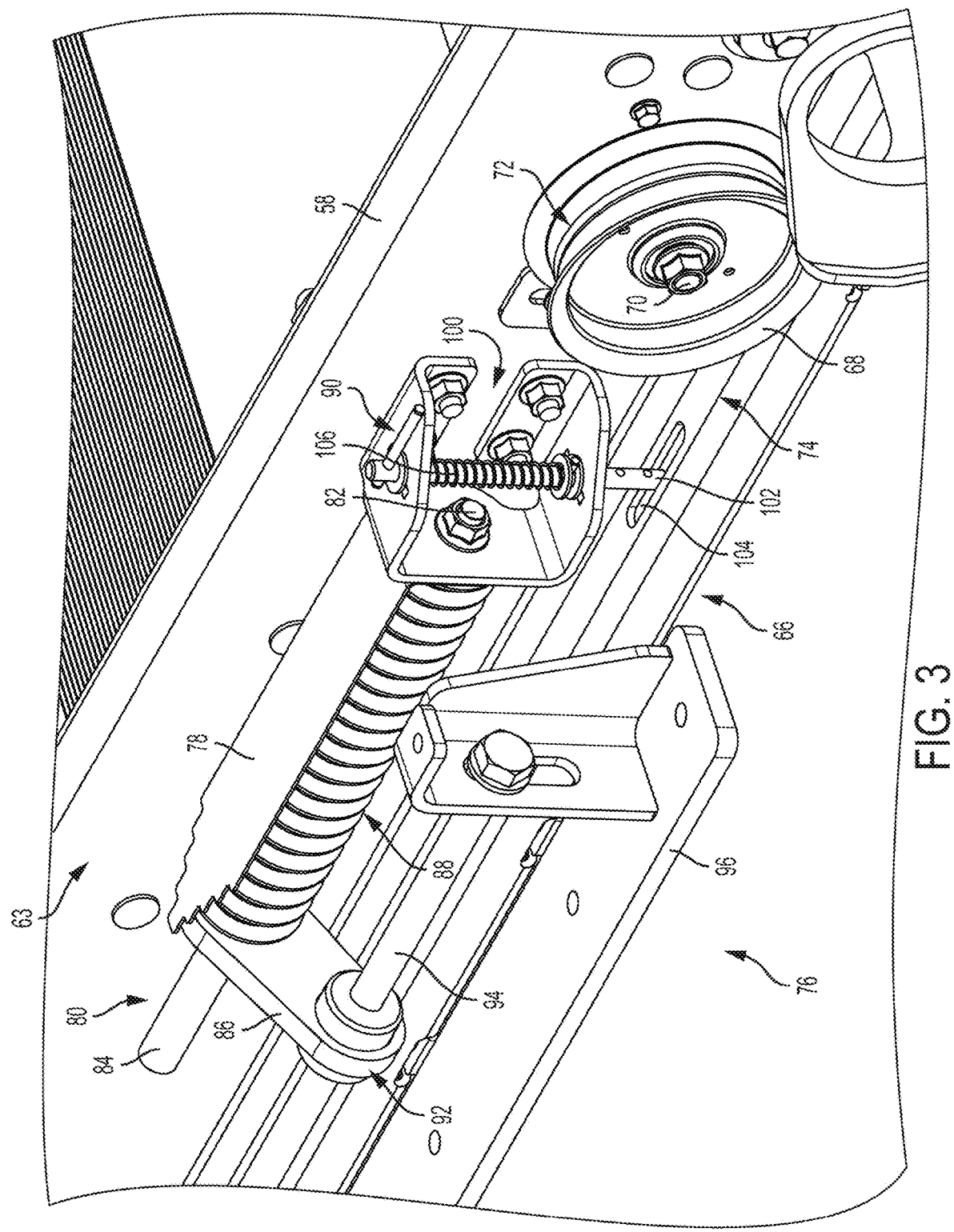
FIG. 3 is a perspective view of a portion of the feeder system.

As seen in FIG. 3, the first side member 58 rotatably supports the rear wheel 68 at an axis 70 about which the wheel 68 freely rotates. A channel 72 defined in the wheel 68 engages a top side of the track 66 which includes an upper curved portion 74 configured to engage the channel 72. The channel 72 and the upper portion 74 are configured in a complementary fashion such that the wheel 68 stays on the track 66 for longitudinal rolling movement of the feeder structure 63 without excessive lateral movement. Each of the remaining wheels, in one embodiment, is similarly configured to provide rolling movement along the corresponding tracks without undesirable lateral movement.

While the feed structure 63 moves longitudinally along the tracks, movement of feed structure 63 is restrained by a bias structure 76 that limits movement of the feed structure along the longitudinal direction 64. The bias structure 76 includes a bias frame 78 which is fixedly coupled to the first side member 58. The bias frame 78 supports a rod 80 having a first end 82 fixedly coupled to the frame 78 and a second end 84 which extends through an aperture of an arm 86 generally transversely extending from the longitudinal axis of the rod 80. The second end 84 slidingly engages the aperture of the arm 86. The rod 80 extends through a biasing member, such as a spring 88, which is captured on the rod 80 between the arm 86 and an end bracket 90 of the bias frame 78 where the rod 80 is fixed.

While the arm 86 is movable along the length of the rod 80, an end 92 of the arm 86 is fixed at a desirable location along a guide rod 94, which is fixedly coupled to a chassis bracket 96. As seen in FIG. 2, the chassis bracket 96 supports both ends of the guide rod 94.

The spring 88 is a compression spring which biases the feed structure 63 toward the wrap floor 62. The amount of bias is determined by the location of the end 92 along the length of the guide rod 94. The location of the arm 86 is adjusted until a desired compression of the spring 88, and consequently, a spring force of the spring 88, is set at a length of the spring 88. Once established, the end 92 of the arm is fixed at the desired location by a stop, such as a set screw. The spring tension of the spring 88 opposes any force applied by the wrap floor that tends to move the feed structure 63 longitudinally toward the accumulator 40. In addition, the spring 88 is configured to resist the force of the cotton conveyed along the top of the feeder structure, since the amount of cotton conveyed by the feeder structure changes.

The bias structure 76 further includes a travel limiter 100 which limits the travel that the floor moves due to the force of the spring 88. The travel limiter 100 includes a pin 102 that extends through the end bracket 90 and into a slot 104 located in the first track 66. Each end of the slot determines a maximum longitudinal distance over which the feed structure 63 moves. Pin 102 extends through a spring 106 which is held in place by sides of the bracket 90. Should the feeder structure 63 require removal, for instance during maintenance or cleaning, the pin 102 is disengaged from the bracket 90. The spring 106 maintains engagement of the pin 102 during normal operations. When the operator needs to remove the feed structure for service, the pin 102 is pulled, which compresses the spring 106, to disengage the pin 102 and to enable disengagement of the feed structure 63. Once the pins 102 are pulled from both sides of the feed structure 63 and the rods 94 are released from the arms 86, the feed structure 63 is movable along the tracks 66. Once freed, movement of the feed structure 63 to the right as illustrated in FIG. 2 defines an opening to provide access to the engine 20 and other devices or structure for repair, maintenance or replacement.

In the illustrated embodiment of FIG. 2, the feed structure 63 moves a distance to the right such that the roller 67 moves to near or at the former illustrated location of the roller 68. In one embodiment, one or more rollers, not illustrated, are coupled to the feed structure 63 and located beneath the tracks 66 such that the free end of the feed structure does not fall or dip excessively when extended.

Figure 4:
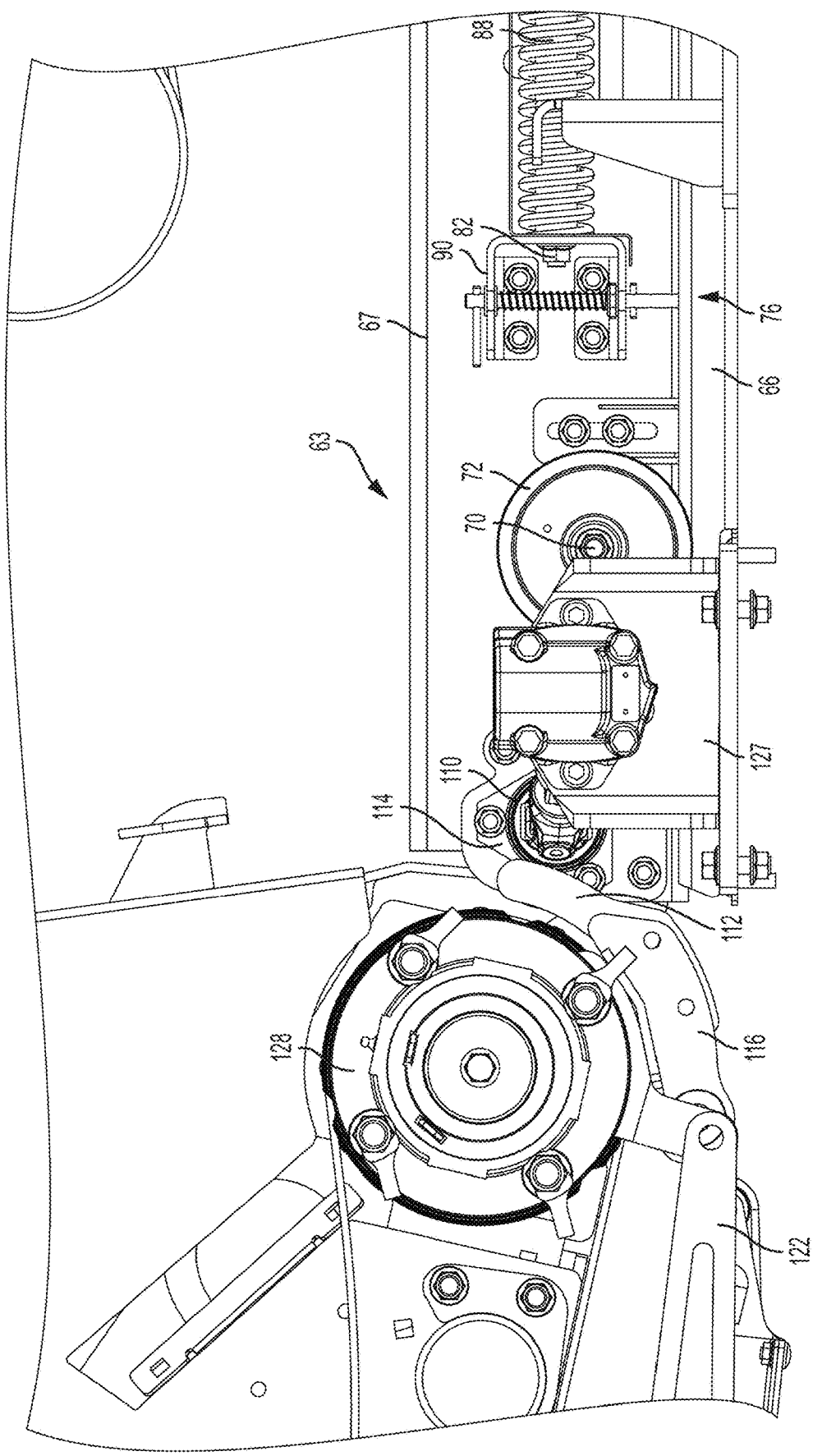
FIG. 4 is a side elevational view of a portion of the feeder system and the round module builder.

The feed structure 63 is biased toward the wrap floor 62 in FIG. 2 to engage certain structures of the module builder 42 as further illustrated in FIGS. 4 and 5. FIGS. 4 and 5 both illustrate an opposite side of the feed structure 63 and wrap floor 62 when compared to FIGS. 2 and 3. As can be seen in FIG. 4, the feed structure 63, which is biased to the left as illustrated, includes a roller 110 which engages a cam plate 112 rotatably coupled to the wrap floor 62. The wrap floor 62 is configured, as described later herein, to move toward and away from the feed structure 63. As the wrap floor 62 moves toward the feed structure 63, the cam plate 112, which is operatively connected to the wrap floor 62, contacts the roller 110 and moves the feed structure 63 to the right as illustrated. The bias structure 76, which is biases the feed structure 63 toward the wrap floor 62, provides a predetermined fixed distance, or gap, between the wrap floor 62 and the feed structure 63 such that wrapping of the cotton module is improved. The wheel 110 functions as a cam follower, such that as the wrap floor 62 moves toward the roller 110, the cam plate 112 moves in an upward direction as illustrated, as inclination of the swing arms 120 and 122 change. The roller 110 is rotatably coupled to the second side member 60 though a roller bracket 114. The various parts of FIG. 4 have been identified with element number of like parts shown in FIGS. 2 and 3.

The cam plate 112 is fixedly coupled to a cam plate support 116 which is fixedly coupled to a bar 118 which extends from one side of the wrap floor 62 to another side of the wrap floor 62. (See FIG. 2). Each end of the bar 118 is rotatably coupled to a swing arm 120 and 122. A first gate roller support 124 and a second gate roller support 126 are also respectively coupled to the swing arms 120 and 122 and include apertures configured to support a lower gate roller 128 of FIG. 4. A bracket 127 is coupled to the side 60 and is configured to support a drive motor 129 of FIG. 2. The drive motor 129 is configured to move the belt 54.

In another embodiment, an actuator (not shown), such as a hydraulic cylinder or electric actuator, moves the feed structure 63 without the wrap floor 62 contacting the feed structure. In this embodiment, a wrap cycle is made as follows: i) a controller signals the actuator to move the feeder assembly or feed structure towards the front of the machine; ii) the controller then engages the wrap floor, feeds a wrap, and disengages the wrap floor as described; and iii) after all of the wrap is fed into the chamber, the controller moves the feeder assembly back to the cotton feeding position before it starts another feeding, module building cycle.

As further illustrated in FIG. 5, the wrap floor 62 includes wrap floor frame supports 130 (See also FIG. 2) which provides support for a wrap floor belt 132, which is located beneath a round module builder belt 133 which moves along the wrap floor belt 132, the lower gate roller 128, an upper gate roller 134, as would be understood by those skilled in the art. The wrap floor 62 moves generally longitudinally along the length of the work vehicle 10 in response to an actuator 156. A wrap is moved between the wrap floor belt 132 and the module builder belt to wrap the cotton to provide a cotton module.

The wrap floor 62 is configured to move longitudinally as well as to rotate about a four bar linkage having a first axis of rotation 140, a second axis of rotation 142, a third axis of rotation 144, and a fourth axis of rotation 146. The first axis of rotation 140 is located at one end of a bar 148 which is rotatably coupled to a stationary frame member 150. The second axis of rotation is located at another end of the bar 148. The third axis of rotation 144 is located at one end of a bar 152 rotatably coupled to a frame member 154. The fourth axis of rotation 146 is located at another end of the bar 152 which also identifies a rotation axis of the swing arm 122.

The swing arm 122 extends from the axis 146 to the bar 118 and is coupled to an actuator 156 which is coupled to a fixed bracket 158. Movement of the actuator 156 engages and disengages cam plate 112 and thus the wrap floor 62, with the roller 110 and thus the feeder structure 63.

In one embodiment, the actuator 156 is a hydraulic actuator which is coupled to a valve (not shown), the function of which is controlled by a controller, such as a processor device, which when instructed, moves the hydraulic cylinder to start a wrap cycle. The controller includes a memory configured to store program instructions and the processor device is configured to execute the stored program instructions to adjust the position of the hydraulic cylinder.

Movement of the wrap floor 62, which includes the frame supports 130, is generally along a longitudinal axis defined by the plane of the belt 132. The link 122, however, moves in both a longitudinal direction as well as an upward or inclined direction with the lower gate roller 128 due to its four bar linkage configuration. The actuator 156 pushes the link 122, and consequently the cam plate 112 forward to the engaged position illustrated in FIG. 4. When the wrap is completed, the actuator 156 pulls the cam plate 112 to a disengaged position and the wrap floor 62 returns to the position illustrated in FIG. 7.

As can be seen in FIG. 2, the bar 118 also supports a plurality of wrap fingers 160 which are fixedly coupled to and extend from the bar 118. When the cam plate 112 contacts the roller 110, upward movement of the cam plate 112 directs the wrap finger 160 upwardly as well.

Figure 6:
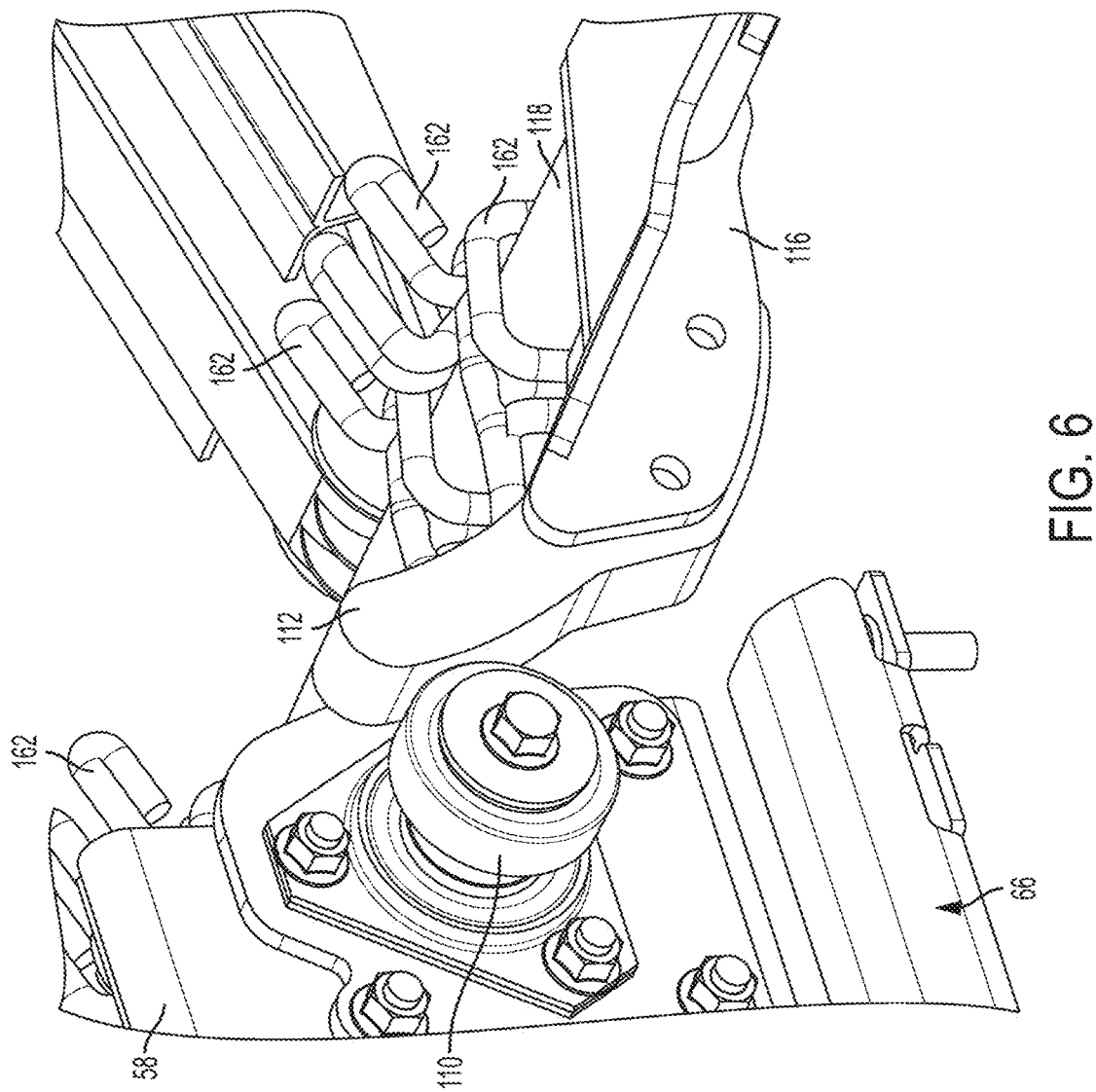
FIG. 6 is a perspective view of a cam plate and a cam follower in a first position.

FIG. 6 illustrates a partial perspective view of an initial position of the cam plate 112 positioned to engage the roller 110 at a first position. In this position, the wrap floor 62 has moved toward the feeder structure 63. This figure illustrates the side of the wrap floor 62 in FIG. 2. The lower gate roller 128 is not illustrated to show a plurality of wrap support fingers 162.

Figure 7:
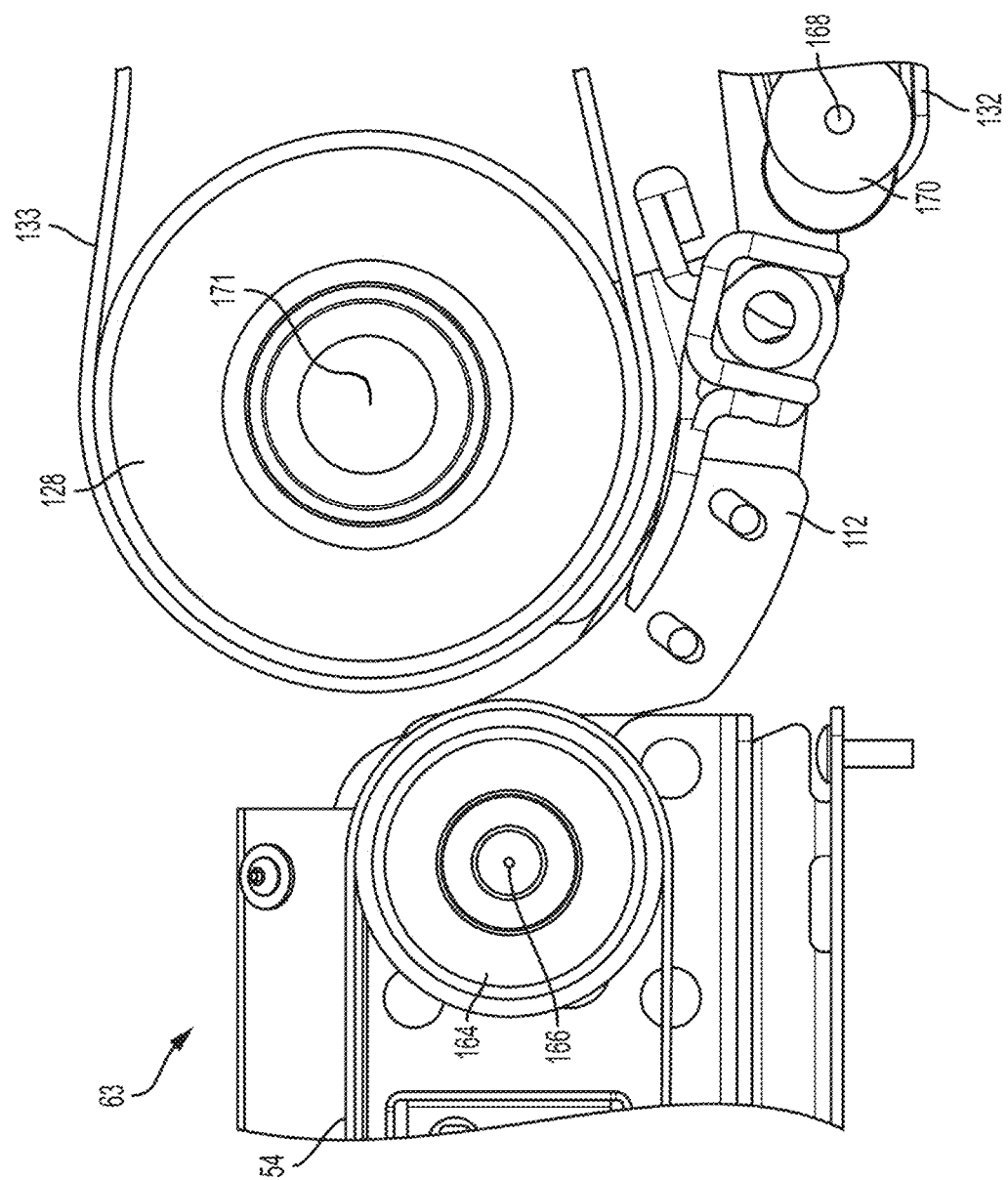
FIG. 7 is a side elevational view of cam plate, a cam follower, and a lower round module builder roller in a first position.
Figure 8:
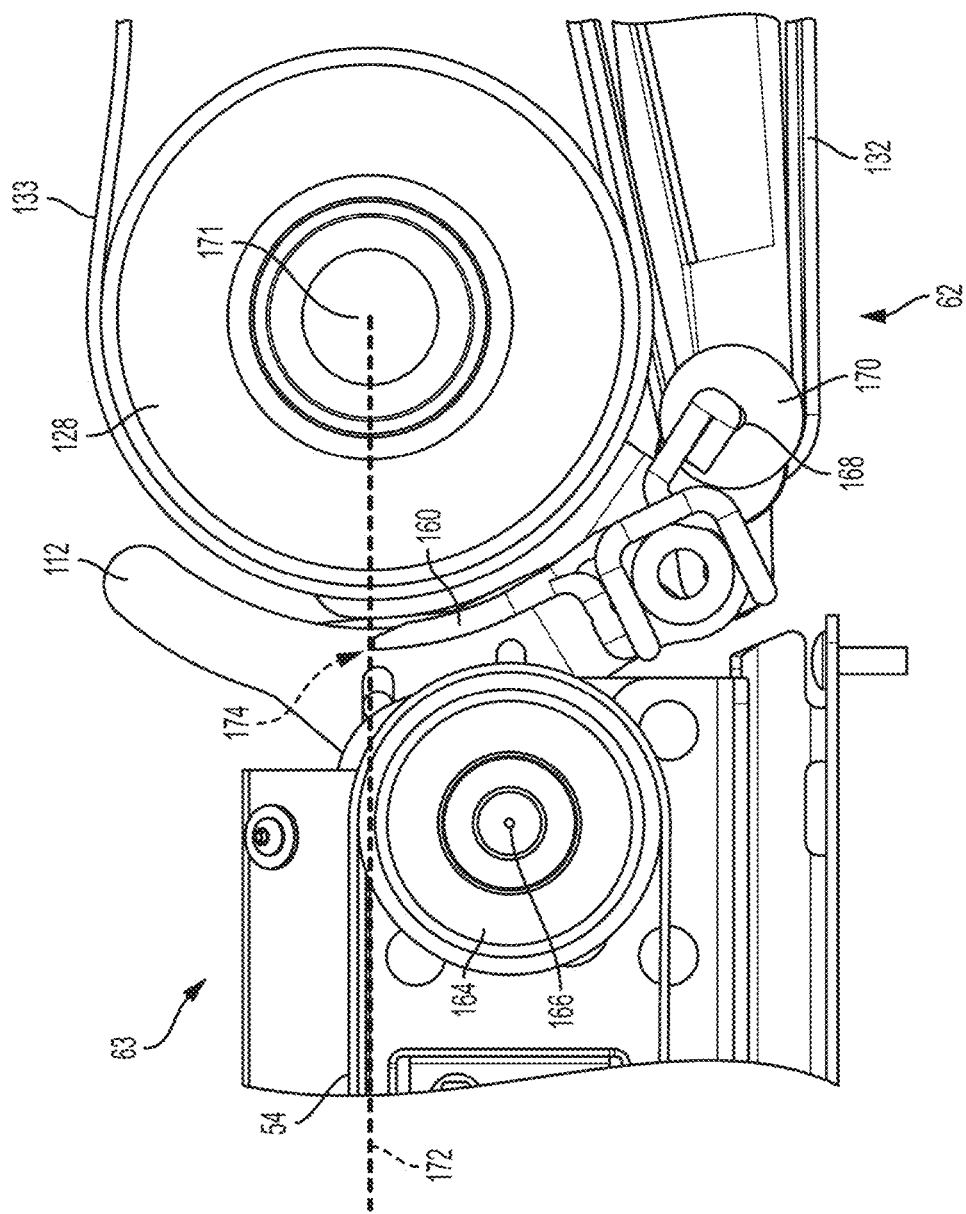
FIG. 8 is a side elevational view of cam plate, a cam follower, and a lower round module builder roller in a second position.
Figure 9:
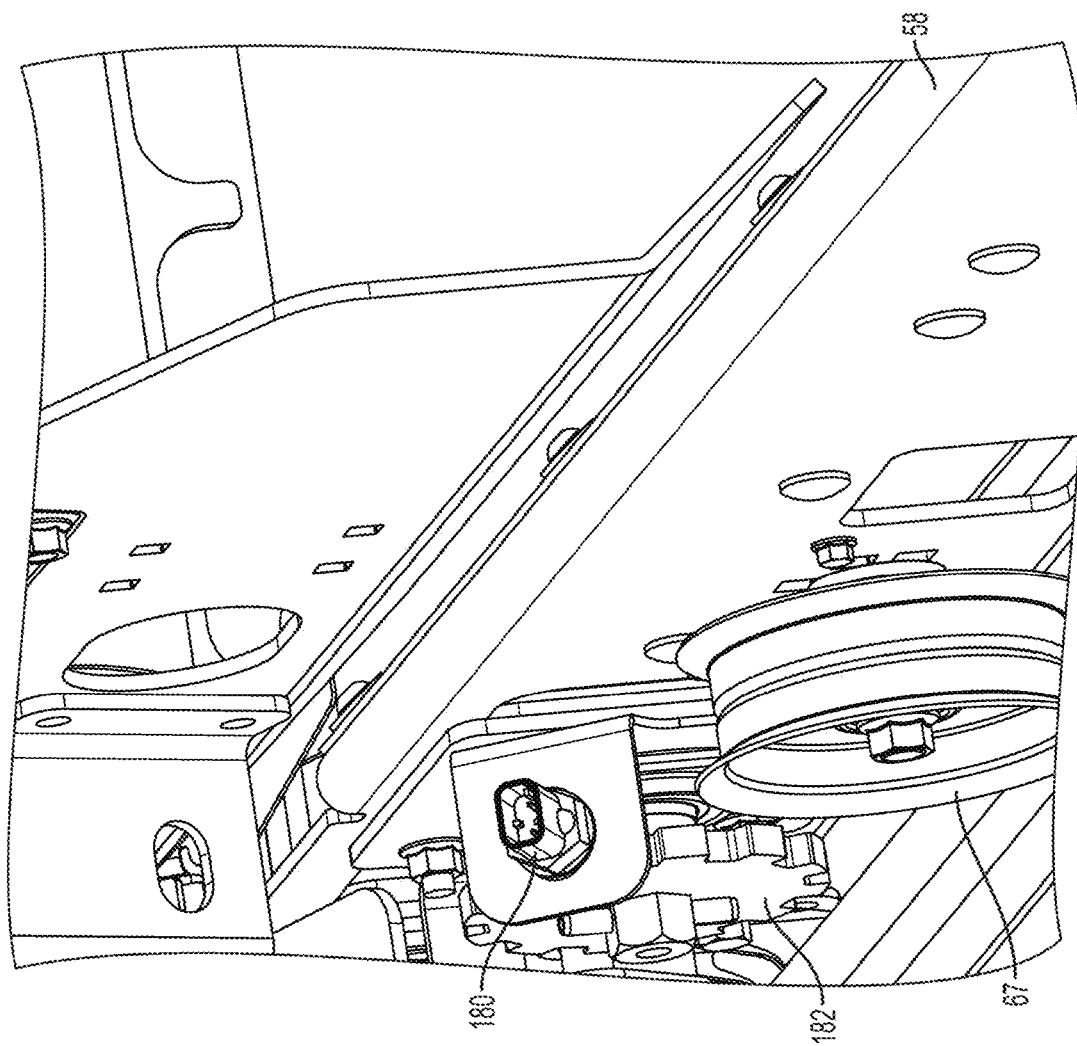
FIG. 9 is a partial perspective view of the feeder system including an electrical connector and a tone wheel.

In FIG. 7, the cam plate 112 of FIG. 4 is illustrated to engage the roller 110, which is not shown. The belt 133 is driven around the lower gate roller 128 in a clockwise direction as illustrated. The feed conveyor belt 54 moves by a roller 164 in a clockwise direction as illustrated, such that the cotton is moved toward the lower gate roller 128. In this position, the wrap floor 62 is in a rearwardmost position and a lowermost position such that a distance between an axis 166 of the roller 164 and an axis 168 of a floor roller 170 is at its greatest.

As the wrap floor 62 is driven toward the feeder structure 63, the wrap floor 62 moves in an upward direction at the same time due to the configuration of the four bar linkage. The wrap floor 62 moves with respect to the lower gate roller, which is fixed with respect to the chassis. In this configuration, the top surface of the feeder belt 54 generally defines a plane which is aligned with a rotational axis 171 of the module builder roller 128 as illustrated by the line 172. In this position, the wrap fingers 160 have moved to a more vertical position to direct a wrap (not shown) which is used to surround and envelop the round cotton module to produce a transportable bundle of cotton. The wrap fingers 160 provide a direction mechanism for the wrap to begin wrapping the cotton into the round module.

The wrap fingers 160, in one embodiment, include a length which extends to the line 172 and defines a transition between an engagement zone below the line 172 and a non-engagement zone above the line 172. In this configuration, should the wrap, which is transported between the belt 132 and the belt 133, be misaligned or misdirected, the wrap fingers 160 provide a directing barrier for the incoming wrap. The wrap is therefore directed along the fingers 160 where loose cotton directed to the wrap substantially insures that the wrap is directed around the belt 133. At an end 174 of the fingers 160, the wrap is no longer directed by the fingers 160 around the round module builder belt 133. While the length of the wrap fingers 160 is shown to extend to the line 172, other lengths are contemplated, including a length extending short of or further than the line 172.

In this position, a working gap is provided between the top surface of the belt 172 and a surface of the belt 133 that intersects the line 172. This working gap is substantially maintained during a complete wrapping cycle for completion of one round module, as well as being maintained from one module to the next. Because the feeder structure 63 includes the bias structure 76, the distance between the feeder structure and the wrap floor 62 held to a relatively consistent gap and as such provides repeatable wrapping operations.

The gap between the fingers 160 and the lower gate roller 128 is maintained because the cam plate 112 pivots about the rotational axis of the lower gate roller 128. The gap between the wrap belts and the round module builder belts changes on whether the wrap floor 62 is located in an engaged or disengaged position with respect to the feed structure 63.

In addition to insuring that the wrap is properly aligned by directing the wrap with the fingers 160, the speed at which the cotton is moved by the belt 154 is monitored. Because proper wrapping of the cotton is determined in part by the cotton hitting the wrap after being directed by the fingers, an electrical connector 180 is located on one of the first side member or second side member. (See also FIG. 2.) The electrical connector is electrically coupled to a tone wheel 182, which provides a speed signal of the belt 54. The connector 180 is configured to receive a plug attached to an electrical cable (not shown) which provides the speed signal to a monitoring or control circuit.

As described herein, the work vehicle 10 includes a rolling feeder system that moves independently of the cotton accumulator. The feeding system rolls fore/aft on a track that is fixed to the machine chassis. This track maintains the feeder system's longitudinal and lateral position. An adjustable spring positions the feeder system against a cam that is attached to the lower gate roller of the round module builder. When the wrap floor engages the feeder system, the feeder system is moved forward by the cam system to adjust the size of the gap between the feeder system and the lower gate roller of the round module builder. When the wrap system disengages, the adjustable spring would allow the feeder system to maintain relationship to the cam and return to the position that optimizes the feeding cycle.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A cotton harvester including a cotton accumulator configured to accumulate cotton removed from cotton plants, the cotton harvester comprising:
    a feeder system configured to move independently of the cotton accumulator and along a longitudinal direction, wherein the feeder system includes a cam follower; and
    a wrap floor configured to move along the longitudinal direction toward the feeder system, wherein the wrap floor includes a contact member adapted to contact the feeder system to establish a working gap between the feeder system and the wrap floor, and wherein the wrap floor includes a cam,
    wherein movement of the wrap floor toward the feeder system moves the cam into contact with the cam follower to determine a dimension of an adjustable gap disposed between the feeder system and the wrap floor.

2. The cotton harvester of claim 1 wherein the adjustable gap is defined by a belt of the feeder system and a gate roller of the wrap floor, wherein the belt of the feeder system is configured to move the accumulated cotton toward the wrap floor, and wherein the wrap floor is configured to direct a wrap toward the accumulated cotton moved by the feeder system.

3. The cotton harvester of claim 1 wherein the feeder system includes a feeder structure configured to move along a track fixed with respect to the accumulator.

4. The cotton harvester of claim 1 wherein the cam rotates about a rotational axis, and wherein contact of the cam with the cam follower rotates the cam about the rotational axis.

5. The cotton harvester of claim 1 wherein contact of the cam with the cam follower changes a location of the feeder system with respect to the longitudinal direction.

6. The cotton harvester of claim 1 further comprising wrap fingers operatively connected to the cam, wherein movement of the cam moves the wrap fingers toward a lower gate roller.

7. A work vehicle including a cotton accumulator configured to accumulate cotton removed from cotton plants to provide a round cotton module bound with a wrap, the work vehicle comprising:
a rolling feeder structure configured to move independently of the cotton accumulator along a longitudinal direction;
a wrap floor configured to move toward and away from the rolling feeder structure, wherein the wrap floor includes a contact member adapted to contact the rolling feeder structure to establish a working gap between the wrap floor and the rolling feeder structure; and
a track upon which the rolling feeder structure moves with respect to the accumulator, wherein the track is fixed to a chassis of the work vehicle and configured to maintain a lateral position of the rolling feeder structure with respect to the chassis.

8. The work vehicle of claim 7 wherein the contact member includes a cam member and the rolling feeder structure includes a cam follower, and wherein contact of the cam member with the cam follower determines a size of the working gap between the rolling feeder structure and the wrap floor.

9. The work vehicle of claim 7 wherein the rolling feeder structure further comprises an adjustable bias structure configured to resist a force applied to the rolling feeder structure by the wrap floor in response to the contact member contacting the rolling feeder structure.

10. The work vehicle of claim 9 wherein the contact member includes a cam member and the rolling feeder structure includes a cam follower, and wherein contact of the cam member with the cam follower determines a size of the working gap between the rolling feeder structure and the wrap floor.

11. The work vehicle of claim 7, wherein the rolling feeder structure includes is movable on the track between a first position to move cotton toward the wrap floor and a second position to define an opening to provide access to the work vehicle for repair, maintenance, or replacement.

12. A work vehicle including a cotton accumulator, the work vehicle comprising:
a feeder system configured to move independently of the cotton accumulator that includes a cam follower;
a wrap floor configured for movement toward the feeder system that includes a cam; and
a track upon which the feeder system moves with respect to the cotton accumulator that is fixed to a chassis of the work vehicle and configured to maintain a lateral position of the feeder structure with respect to the chassis,
wherein movement of the wrap floor toward the feeder system moves the cam into contact with the cam follower to adjust a dimension of a gap disposed between the feeder system and the wrap floor.

13. The work vehicle of claim 12, wherein the gap is defined by a belt of the feeder system and a gate roller of the wrap floor, wherein the belt of the feeder system is configured to move accumulated cotton toward the wrap floor, and wherein the wrap floor is configured to direct a wrap toward the accumulated cotton moved by the feeder system.

14. The work vehicle of claim 12, wherein the cam rotates about a rotational axis in response to contact between the cam and the cam follower.

15. The work vehicle of claim 12, wherein contact between the cam and the cam follower changes a location of the feeder system in a longitudinal direction.

16. The work vehicle of claim 12, further comprising wrap fingers operatively connected to the cam, wherein movement of the cam causes movement of the wrap fingers toward a lower gate roller.

17. The work vehicle of claim 12, wherein the feeder system is movable on the track between a first position to move cotton toward the wrap floor and a second position to define an opening to provide access to the work vehicle for repair, maintenance, or replacement.

18. The work vehicle of claim 12, wherein the feeder system includes an adjustable bias structure configured to resist a force applied to the feeder system by the wrap floor in response to contact between the cam and the cam follower.

19. The work vehicle of claim 18, wherein the bias structure includes a spring that biases the feeder system toward the wrap floor.

20. The work vehicle of claim 19, wherein the bias structure includes a travel limiter that limits longitudinal travel of the feeder system relative to the wrap floor.

* * * * *